United States Patent Office.

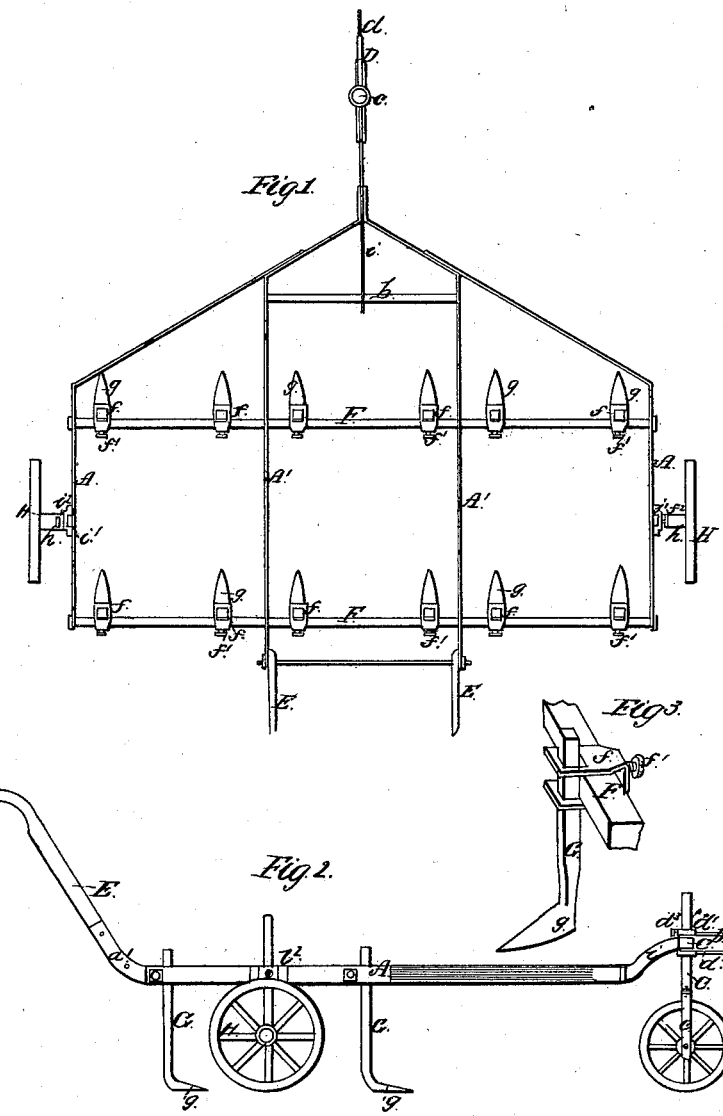

THOMAS HICKS, OF PACATONICA, ILLINOIS.

*Letters Patent No. 86,750, dated February 9, 1869.*

IMPROVEMENT IN CULTIVATORS.

The Schedule referred to in these Letters Patent and making part of the same.

*To all whom it may concern:*

Be it known that I, THOMAS HICKS, of Pacatonica, in the county of Winnebago, and State of Illinois, have invented new and useful Improvements in Cultivators; and I do hereby declare that the following is a full and exact description of the same, reference being had to the accompanying drawings, and to the letters of reference marked thereon.

This invention relates to an improvement in cultivators; and consists mainly in an arrangement whereby the number of teeth, as well as their depth of action, may be efficiently regulated, as will hereinafter more fully appear.

In the drawings—

Figure 1 is a plan view of my invention,

Figure 2, a side elevation, and

Figure 3, a view of parts detached.

To enable others skilled in the art to make and use my invention, I will proceed to describe its construction and operation.

A A represent the side pieces, the forward ends of which are bent inward, and attached to the two pieces A' A', whose forward ends also bend inward, forming, in connection with the pieces A A, an obtuse angle, and constituting the main frame of the machine, which is constructed entirely of metal.

$b$ is a cross-bar, which is attached to the two pieces A' A', and forms a suitable connection for the bar $i$, the forward end of which is made with an upward curve, and is provided with the vertical socket C, in which is a standard, $c$, with bifurcated arms $c^1$, for the attachment of the guide-wheel $c^2$.

The standard $c$ is also provided with a bifurcated guide, D, at the forward end of which is a hook, $d$, for the draught-attachment, and at the rear end two sockets, $d'$ $d''$, of which the upper, $d'$, has a set-screw, $d^3$, by which the standard can be adjusted, as described.

The rear ends of the pieces A' A' incline upward, as shown at $a^1$, and form attachments for the handles E E.

F F represent horizontal bars, square in shape, running across the machine, and passing through suitable orifices in the pieces A A A' A'.

Upon the bars F are the forked clamps $f\,f$, &c., of the form shown in fig. 3, which are provided with orifices corresponding in shape to that of the standards G, which are constructed in the same piece as the teeth or plows $g$.

The clamps $f$ are provided with set-screws $f'$, whereby they are secured at any point along the bars F, which set-screws serve to adjust the standards G vertically.

On either side of the pieces A A are the wheels H H, attached, by the axles $h\,h$, to the sliding standards I, which move in the sockets $i'\,i'$, being secured by set-screws $i''\,i''$.

From this description, it will be seen that this construction is one of great strength, simplicity, and ease of adjustability, both in regard to the number of teeth employed and their depth of operation, as the attachment of the standard G enables any desired number to be employed, and the perfect vertical adjustability of the wheels and teeth renders it exceedingly effective.

Having thus fully described my invention,

What I claim, and desire to secure by Letters Patent, is—

1. The sliding clamps $f$, in combination with the standards G, bars F, and set-screws $f'$, as and for the purpose described.

2. The cultivator above described, consisting substantially of the frame A A A' A', bars F F, wheels $c^2$ H H, with their attachments, clamps $f$, and standards G, arranged and operated as and for the purpose set forth.

This specification signed and witnessed, this 15th day of December, 1868.

THOMAS HICKS.

Witnesses:
C. W. SHELDON,
G. W. FORD.